US012709565B1

(12) United States Patent
Kato et al.

(10) Patent No.: US 12,709,565 B1
(45) Date of Patent: Aug. 18, 2026

(54) NANOFIBER MANUFACTURING DEVICE AND METHOD FOR QUANTUM COMPUTING

(71) Applicant: Nanofiber Quantum Technologies, Inc., Tokyo (JP)

(72) Inventors: Shinya Kato, Tokyo (JP); Akihisa Goban, Tokyo (JP); Takao Aoki, Tokyo (JP)

(73) Assignee: Nanofiber Quantum Technologies, Inc., Tokyo (JP)

( * ) Notice: Subject to any disclaimer, the term of this patent is extended or adjusted under 35 U.S.C. 154(b) by 333 days.

(21) Appl. No.: 18/606,284

(22) Filed: Mar. 15, 2024

(51) Int. Cl.
*C03B 37/025* (2006.01)

(52) U.S. Cl.
CPC ...... *C03B 37/0253* (2013.01); *C03B 2205/68* (2013.01)

(58) Field of Classification Search
CPC ........................ C03B 37/0253; C03B 2205/68
See application file for complete search history.

(56) References Cited

U.S. PATENT DOCUMENTS

2006/0051043 A1* 3/2006 Huang ................. G02B 6/2551 385/134
2018/0031766 A1* 2/2018 Carlson ................ G02B 6/2555

FOREIGN PATENT DOCUMENTS

JP 2016153850 A 8/2016
JP 2023055195 3/2020
WO 2022009950 A1 1/2022

OTHER PUBLICATIONS

C.-L. Hung et al. "Quantum spin dynamics with pairwise-tunable, long-range interactions", PNAS, Aug. 5, 2016, E4946-E4955, 113 (34), www.pnas.org/cgi/doi/10.1073/pnas. 1603777113.
H. J. Briegel et al. "Quantum Repeaters: The Role of Imperfect Local Operations in Quantum Communication", The American Physical Society, Dec. 28, 1998, vol. 81, No. 26, p. 5932-5935.
L.-M. Duan et al. "Robust quantum gates on neutral atoms with cavity-assisted photon scattering", The American Physical Society, Sep. 28, 2005, 032333-1-032333-4, 72, DOI: 10.1103/PhysRevA. 72.032333.
L.-M. Duan et al. "Scalable Photonic Quantum Computation through Cavity-Assisted Interactions", The American Physical Society, Mar. 26, 2004, 127902-1-127902-4, DOI: 10.1103/PhysRevLett.92. 127902.
Eric Abraham et al., "Teflon feedthrough for coupling optical fibers into ultrahigh vacuum systems", Applied Optics, Apr. 1, 1998, pp. 1762-1763, vol. 37, No. 10.

(Continued)

*Primary Examiner* — Uyen Chaun N Le
*Assistant Examiner* — Hoang Q Tran
(74) *Attorney, Agent, or Firm* — Richard T. Ogawa; Ogawa P.C.

(57) ABSTRACT

In an example, the present invention provides a method of designing and manufacturing a nanofiber device by pulling an optical fiber and a method of preserving the device in a storage chamber. For designing the device, the optical fiber characteristics are calculated numerically to shape the fiber with transmission adiabaticity and total length of the device. For the fiber processing, a pulling rig is provided. The rig enables a desirable pulling sequence to fabricate the numerically generated shape of the fiber. For preserving the device, a portable, small chamber-shaped container and storage method are provided.

14 Claims, 14 Drawing Sheets

(56) References Cited

OTHER PUBLICATIONS

G. Brambilla, "Optical fibre nanowires and microwires: A review", Journal of Optics, Mar. 17, 2010, pp. 1-19, IOP Publishing, stacks.iop.org/JOpt/12/043001.
Shinya Kato et al., "Single-frequency fiber Fabry-Perot Brillouin laser," Optics Letters, Sep. 21, 2022, pp. 5000-5003, vol. 47, No. 19, Optica Publishing Group.
J. D. Love et al., "Quantifying Loss Minimisation In Single-Mode Fibre Tapers", Electronics Letters, Aug. 14, 1986, pp. 912-914, vol. 22, No. 17.
S. Ravets et al., "Intermodal energy transfer in a tapered optical fiber: optimizing transmission", Optical Society of America, Oct. 25, 2013, pp. 2361-2371, vol. 30, No. 11, http://dx.doi.org/10.1364/JOSAA.30.002361.

* cited by examiner

Figure 5

$$\pi r_{i-1}^2(1-V)L_i = \pi r_i^2(1+V)L_i \quad \Rightarrow \quad r_i = \sqrt{\frac{1-V}{1+V}}\, r_{i-1}$$

$$\tan\theta_{i+1} = \frac{r_{i-1} - r_i}{(L_i + V(L_i + L_{i+1})) - L_{i+1}} = \frac{r_{i-1} - r_i}{(1+V)L_i - (1-V)L_{i+1}}$$

Figure 11

NANOFIBER MANUFACTURING DEVICE AND METHOD FOR QUANTUM COMPUTING

BACKGROUND OF INVENTION

Quantum computing is a type of computing that utilizes quantum mechanics to perform certain tasks more efficiently than classical computing. In classical computing, bits can exist in one of two states, either 0 or 1, but in quantum computing, qubits can exist in a superposition of both 0 and 1 states simultaneously. This allows quantum computers to perform certain calculations exponentially faster than classical computers, such as factorization of large numbers, optimization problems, and simulations of quantum systems.

However, quantum computing also has some drawbacks. One major challenge is that qubits are highly susceptible to noise and decoherence, which can cause errors in the computation. Therefore, quantum computers require careful error correction techniques to maintain the accuracy of the computation. Another challenge is that quantum computers are highly specialized and can only perform certain types of calculations, which limits their versatility for general-purpose computing tasks. Additionally, the physical hardware required for quantum computing is complex and expensive to build and maintain, which makes quantum computers difficult and costly to scale up. Finally, quantum algorithms are not necessarily faster for all problems, and it is unclear whether they will ever be able to replace classical computing for all applications.

From the above, it is seen that techniques for improving quantum computing are desired.

SUMMARY OF INVENTION

According to the present invention, techniques generally related to fabrication techniques for nanofiber devices. In particular, the nanofiber devices can be used with quantum computing and repeater applications. Merely by way of example, the invention can be applied to a variety of applications such as cryptography, drug discovery, optimization, machine learning and artificial intelligence, finance, weather forecasting, chemical, mechanical, electrical, civil, nuclear fusion and fission, economics, materials, and any other complex human or non-human matters.

In an example, the present invention provides a fabrication system of nanofiber devices and a method to design a fiber taper connecting nanofiber to an optical fiber with a low loss and a short taper length.

In an example, this invention provides a nanofiber fabrication system comprising fiber holders and a heating-torch assembly and a computer control unit to control the positions of the fiber holders and the torch assembly and to collect data from sensors in the system.

In an example, the present invention provides a storage container designed specifically for nanofiber devices. Nanofiber devices, characterized by their thin diameters on the order of a few micrometers or less than 1 micrometers, are sensitive to surface contamination and have been difficult to handle. Existing methods required immediate use after fabrication in a clean environment. To address these challenges, a portable chamber and storage method have been invented.

Depending upon the example, the present invention can achieve one or more of these benefits and/or advantages. In an example, the present invention provides a quantum computing device using a nanofiber region. Such nanofiber region is configured with a pair of reflectors to form a cavity for a quantum computing. In an example, the device uses conventional optical techniques, and is compact and efficient. In an example, the present invention offers advantages of generating outputs that are reliable and efficient. These and other benefits and/or advantages are achievable with the present device and related methods. Further details of these benefits and/or advantages can be found throughout the present specification and more particularly below.

A further understanding of the nature and advantages of the invention may be realized by reference to the latter portions of the specification and attached drawings.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which:

FIG. 5 shows a simplified diagram of the optical characterization setup in an example of the present invention.

FIG. 11 is a simplified diagram of a chamber for a storage of a nanofiber device in an example of the present invention.

DETAILED DESCRIPTION OF THE EXAMPLES

Figure 1:
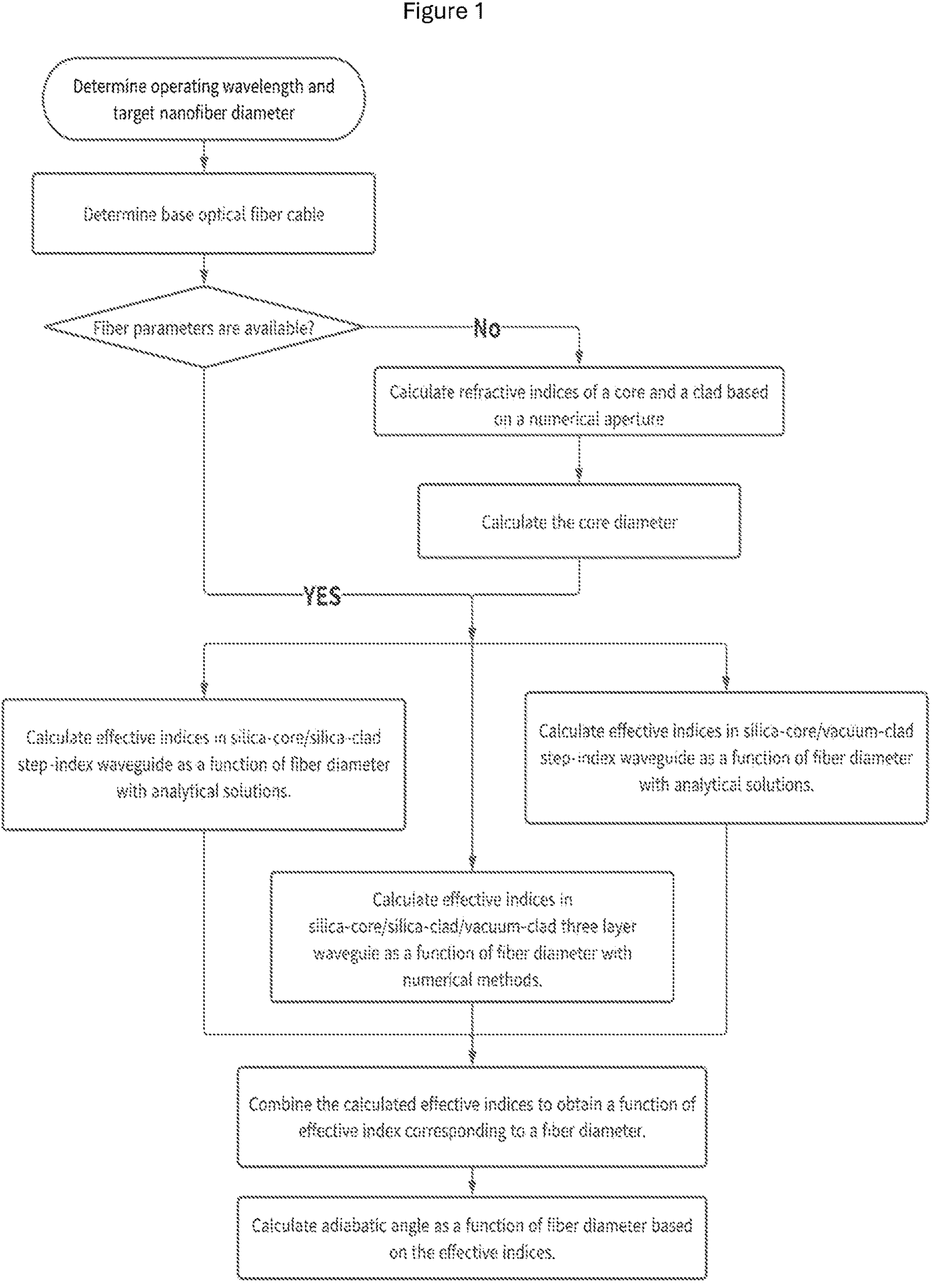
FIG. 1 shows a simplified diagram of a workflow of calculation of adiabatic angle of a fiber taper as a function of fiber diameter in an example of the present invention.

Nanofibers play a role in quantum technologies due to their unique physical properties and ways they interact with quantum systems. Here are one or more reasons why nanofibers are desirable in this field:

High Surface Area Interaction: Nanofibers, due to their high surface area to volume ratio, offer a large interface for interaction with quantum dots, atoms, or other quantum systems. This increased interaction area can enhance the sensitivity and efficiency of quantum sensors and devices.

Interface neutral atoms: Neutral atoms can be trapped in the vicinity of nanofiber by using laser beams. This integration is crucial for developing quantum computing elements and photonics, where controlling light at the quantum level is desirable.

Photon Manipulation: Nanofibers can manipulate photons at a very small scale, which is vital for quantum communication and computing. They can be used to create nanoscale optical waveguides, which are desirable for controlling and guiding light in quantum circuits.

Enhanced Light-Matter Interaction: The interaction of light with matter at the nanoscale is fundamental to quantum technologies. Nanofibers can enhance this interaction, making them useful in developing components for quantum networks, like single-photon sources and quantum memories.

Quantum Sensing and Metrology: Nanofibers can improve the sensitivity of quantum sensors used in metrology. Their small size allows for the detection of minute physical quantities, like magnetic fields, electric fields, and gravitational forces, with unprecedented precision.

Cryogenic Environments: Some quantum technologies require operation at extremely low temperatures (cryogenics). Nanofibers, due to their mechanical properties, can remain stable and functional in these extreme environments.

Material Versatility: Nanofibers can be fabricated from a variety of materials, including those with specific quantum properties. This versatility enables tailored solutions for different quantum applications.

Nanoscale Confinement: In quantum technologies, confining quantum particles like electrons or photons at the nanoscale is crucial for controlling their quantum states. Nanofibers provide a means to achieve such confinement.

Nanofibers are desirable in quantum technologies due to their ability to manipulate and interact with light and matter at the quantum level, their high surface area, and their suitability for integration with other quantum systems. However, fabricating low-loss nanofibers, particularly for applications in optics and quantum technologies, poses several challenges, including one or more listed below.

Material Imperfections: Nanofibers must be made from materials with extremely low defect rates. Any imperfections, such as impurities, inhomogeneities, or structural defects, can cause scattering or absorption of light, leading to losses. Achieving the necessary level of material purity and structural perfection at the nanoscale is challenging.

Surface Roughness: At the nanoscale, even minute surface roughness can significantly impact the performance of optical nanofibers. Rough surfaces can scatter light, leading to losses. Achieving and maintaining a smooth surface on a nanofiber is technically demanding.

Diameter Uniformity: The diameter of the nanofiber needs to be uniform along its length to ensure consistent optical properties. Variations in diameter can cause light to scatter or be absorbed, increasing loss. Maintaining this uniformity during the fabrication process is difficult, especially for longer fibers.

Handling and Fabrication Stress: The process of drawing nanofibers can introduce stresses and strains into the material, potentially leading to micro-cracks or other defects that increase loss. Additionally, handling and assembling these delicate fibers without causing damage is a delicate process.

Environmental Factors: Nanofibers are sensitive to environmental factors such as humidity, temperature, and atmospheric contaminants. These factors can affect the fiber's properties, leading to increased absorption and scattering of light.

Tapering Process: For optical applications, nanofibers often require tapering to specific dimensions. This tapering process should be precisely controlled to avoid introducing defects.

Nanofiber devices, where nanofibers are connected to standard optical fibers using taper shapes, are desirable components for various optical applications. However, designing and fabricating efficient taper shapes while minimizing propagation losses and overall length is a challenging task. To address this challenge, the present invention provides a fabrication system and a method to manufacture a nanofiber device.

In an example, the present invention provides a nanofiber fabrication system for a quantum device, e.g., repeater, computer. The system has a fiber optical cable comprising a first end region and a second end region. The system has a first fiber optical cable holder. In an example, the first fiber optical cable holder has a first substrate. In an example, the first fiber optical cable holder is coupled to the first end region. The system has a second fiber optical cable holder, which has a second substrate. In an example, the second fiber optical cable holder is operably coupled to the first fiber optical cable holder while the second fiber optical cable holder is coupled to the second end region. In an example, a spatial region is between the two holders to expose a center region of the fiber optical cable.

In an example, the system has a heating-torch assembly configured within a vicinity of a spatial region between the first fiber optical cable holder and the second fiber optical cable holder. In an example, the system has a flammable-gas control unit coupled to the heating torch assembly. The system has an imaging system configured to determine a relationship between the heating torch assembly and a portion of the fiber optical cable. In an example, the system has an optical characterization device coupled to the fiber optical cable and a computer control device being coupled one or more sensors coupled to the fiber optical cable, In an example, the first optical cable holder and the second fiber optical cable holder each comprise a V-shaped groove for holding a portion of the fiber optical cable.

In an example, the system has a wafer substrate having a clear-cut region for holding the wafer substrate. In an example, the wafer substrate comprises a silicon wafer, a glass wafer, or other wafer.

In an example, the first fiber optical cable holders comprise a force sensor configured to measure a tension of the optical fiber cable having a sensitivity ranging 0.02 mN/m to 2.5 N/m, among others. In an example, the first fiber optical cable holder and second fiber optical cable holders each comprises a motorized translation stages along an axis of the fiber optical cable. In an example, the first fiber optical cable holder and the second fiber optical cable holders each comprises a tip, a tilt, a yaw, an x, y, z-axis control for an alignment.

In an example, the heating-torch assembly comprises a gas inlet for providing a flammable gas, the heating torch having an 1D or 2D array of openings for creating a desired shape of a flame, and each of the openings having a diameter ranging from 200 micrometers to 100 micrometers or smaller, and a number of openings range from 1 to 20 or more. In an example, the heating torch assembly comprise a motorized stage for each of the three orthogonal directions and a distance between the hearing torch assembly and a portion of the fiber is controlled with a spatial position resolution ranging from 10 micrometers or higher resolution by using an imaging system.

In an example, the system has a flammable-gas control unit comprising a hydrogen oxygen generator or mixture gas of $H_2$ and $O_2$, and others. In an example, the flammable-gas control unit comprises a mass-flow controller to control a size of a flame during a fabrication process. In an example, the flammable-gas control unit comprises a particle filter for reduce contamination from a first level to a second level, and the flammable-gas control unit comprises a metal meshed grid for suppressing a flame propagating backward for safety.

In an example, the imaging system comprising a microscope objective lens and one or more imaging devices from two orthogonal directions for monitoring a location of a portion of the fiber optical cable relative to a flame such that an imaging resolution ranges from 10 micrometers or higher. In an example, the imaging system comprising a thermal imaging device to measure the temperature of a frame and the frame temperature is controlled by adjusting a flammable gas flow rate by using the mass-flow controller.

In an example, the system has an optical characterization setup comprising a first laser source at target wavelength ranging from 700 nanometers to 2 micrometers for characterizing a loss and a second laser source at shorter wavelength ranging from 300 nanometers to 2 micrometers for characterizing a diameter to change of a fiber during a fiber processing in real time via short-time Fourier transform of transmission data to observe a propagation mode cutoffs.

In an example the system has a computer control unit comprising a computer device to store data from one or more photodetectors in an optical characterization setup, the computer control unit configured to show a recorded data during a fiber processing in a real time.

In an example, the quantum device is a quantum computer or quantum repeater.

Further details of the present system and related methods can be found throughout the present specification and more particularly below.

FIG. 1 shows a simplified flowchart of a numerical design of a nanofiber device. The process involves several one or more steps, which are listed below:

Selection of the Optical Fiber: In an example, the choice of optical fiber to be used is determined based on the wavelength of operation for the fabricated nanofiber. Typically, selecting a thinner optical fiber at the outset simplifies the tapering process and reduces the overall length of the taper. However, considering the potential simultaneous use of the fabricated nanofiber alongside conventional optical fiber devices, opting for a standard-sized optical fiber as the base fiber is more convenient.

Calculation of Optical Fiber Parameters: In an example, when detailed information about the refractive indices of the materials used in the optical fiber and/or the core diameter is not readily available, it becomes necessary to calculate it based on available parameters on the fiber. The refractive indices of the optical fiber's core and cladding are primarily determined by the proportion of different materials added. For example, in the case of using germanium as the dopant, a parameterized approach assumes the ratio of $GeO_2$ to $SiO_2$ as a parameter, which subsequently influences the refractive indices based on this ratio. Additionally, the dispersion characteristics of each material can be computed using the Sellmeier equation to determine the refractive indices at the desired design wavelength. In this calculation, the cladding section is considered as pure $SiO_2$, while the core section, with a variable $GeO_2$ additive ratio as a parameter, allows for the calculation of the optical fiber's numerical aperture (NA). Since commercially available optical fibers typically provide information about their NA, the ratio can be evaluated using the given NA value. Furthermore, by considering the core diameter as a parameter, the electric field distribution of the propagation modes at the design wavelength can be computed using the analytical solutions for optical fiber modes. Generally, commercially available optical fibers define their mode field diameter (MFD). The core diameter is evaluated by comparing the MFD and the computed electric field distribution.

Numerical Calculation of Effective Refractive Indices: In an example, to ascertain the characteristic of propagation loss in the tapered region, it is imperative to determine the effective refractive indices of propagation modes based on the optical fiber's thickness. In this context, assuming a constant ratio of core-to-cladding diameter in the optical fiber, the waveguide's geometry is uniquely determined given the fiber's diameter. In cases where the propagation mode predominantly localizes in the core region, and the electric field distribution in the outer region of its clad can be neglected, analytical solutions exist for effective refractive indices of specific propagation modes in the step-index waveguides. Conversely, when the optical waveguide structure involves three layers, encompassing a glass core, a glass cladding, and an outer region of vacuum with non-negligible electric field distribution, analytical solutions for propagation modes are not available. To address this complexity, a numerical approach is employed by discretizing the waveguide structure and determining propagation modes numerically. Consequently, effective refractive indices can be evaluated based on the results obtained. Thus, depending on the optical fiber's diameter, effective refractive indices for various scenarios are calculated, including: analytical solutions for the two-layer structure with a glass core and glass cladding, numerical solutions for the three-layer structure with a glass core, glass cladding, and outer vacuum region, and analytical solutions for the two-layer structure with a glass core and an outer vacuum region. These results are then smoothly connected using splines to determine effective refractive indices for arbitrary optical fiber thicknesses.

To account for the adiabaticity of transmission through the tapered region, we define the following adiabatic criterion:

$$\left|\frac{dr(z)}{dz}\right| \leq \frac{r(z)\times(\beta_1-\beta_2)}{2\pi} = \Omega(r), \quad \text{a.}$$

where r(z) is the taper shape and $\beta_1$, $\beta_2$ are the propagation constants for the fundamental propagation $HE_{11}$ mode and the first excited $HE_{12}$ mode, respectively. Here, we introduce a local adiabatic angle $\Omega(r)$. We can calculate the local propagation constants from the effective indices and design the taper to satisfy the above relation. It should be noted that an effective refractive index $n_{eff}$ for the propagation mode with $\beta_1$ can be calculated as $$n_{eff} = \lambda\frac{\beta_1}{2\pi},$$

where $\lambda$ is a wavelength in vacuum. In an example, a desirable metric for characterizing propagation loss at specific wavelengths is the definition of an adiabatic angle. In numerical optimization, by maintaining the ratio of local taper angles to this adiabatic criterion angle below a certain value called an adiabatic parameter, the adiabaticity of optical propagation can be evaluated.

Figure 10:
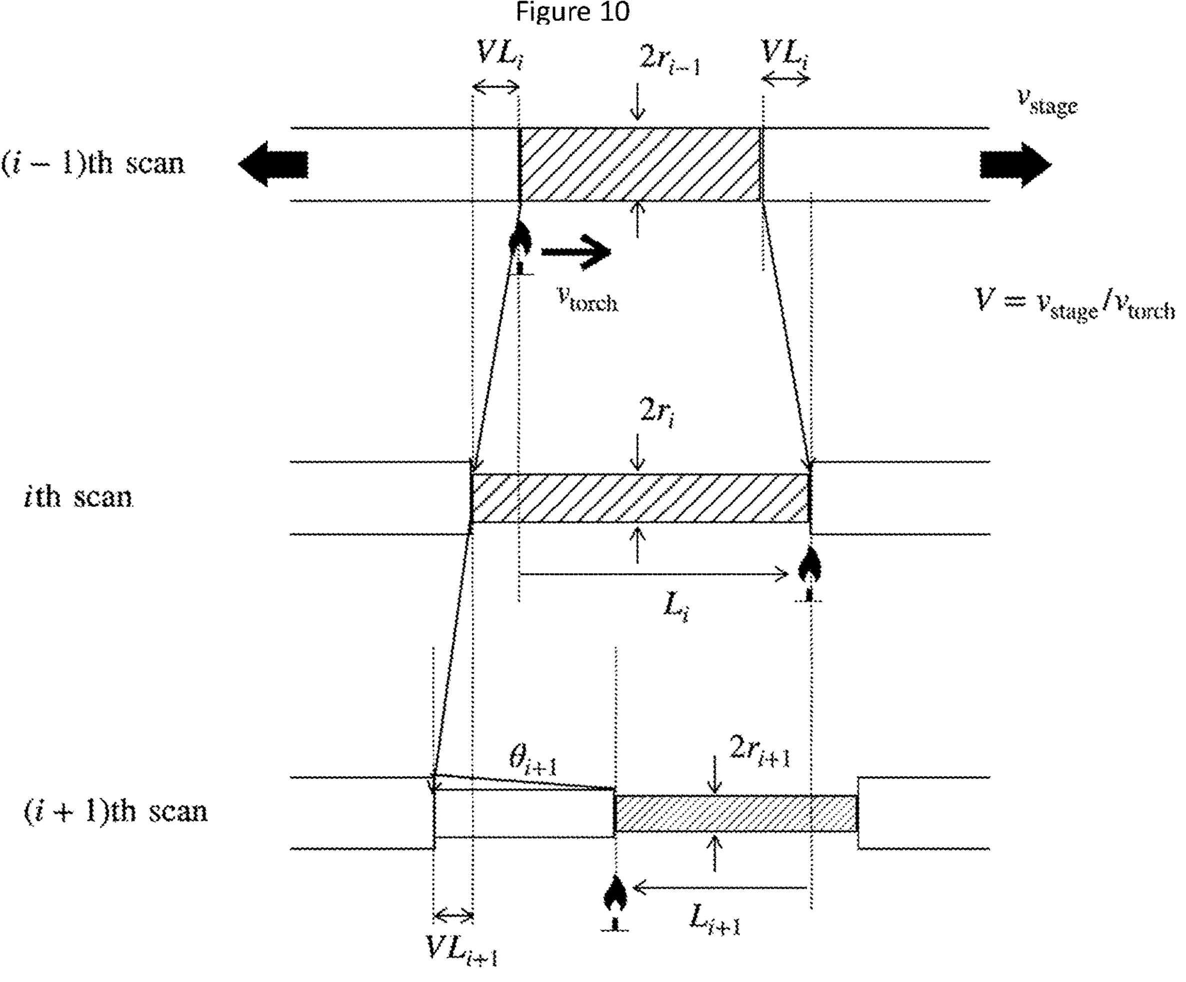
FIG. 10 shows a simplified diagram of the model of fiber pulling and definition of local taper angle according to an example of the present invention.

Numerical Optimization of Processing Parameters: In an example, in this step, we perform the optimization of the taper shape using the total taper length and propagation loss characteristics as the cost function. To do this, we incorporate the operating conditions of the actual optical fiber processing machine into our optimization process. For instance, in methods like the Flame-Brushing technique, where we assume the process maintains a constant volume of heated area during each sweep of the heat source, it is necessary to model the stretching process accordingly. Based on this assumption, there are additional processing constraints to ensure the validity of the modeling. For instance, flame brushing has a constraint to prevent heating a portion that is not heated in previous sweeps. FIG. 10 shows the numerical model of the Flame-Brushing technique. In an example, an optimization process involves constraints related to the processing conditions and the ratio of the adiabatic criterion angle to the actual local taper angle. Assuming a constant stretching speed, the free parameters are the sweep distances of the heat source and the number of sweeps. Since the number of sweeps is determined by the final nanofiber diameter, the parameters are an array of sweep distances, with the array size equal to the number of sweeps.

In particular, the constraints in this model are linear respect to the sweep parameters, which allows for the use of linear programming techniques in numerical optimization. It's worth noting that even with approximately 300 sweeps, which means that there are 300 free parameters, the optimization process can be completed within seconds on a standard laptop computer thanks to the linearity. In this step, we define a cost function based on total taper length and propagation loss characteristics while considering the constraints associated with the actual operation of the optical fiber processing machine.

As described in this step, the improving process incorporates operations of fiber processing. However, it's challenging to fabricate these devices with taper shapes that match a desired design and exhibit excellent optical properties like low transmission loss. In particular, the surface quality of the nanofiber devices is desired, as it can significantly alter the evanescent field of the propagation mode. To overcome this obstacle, we've developed a method and a fiber processing machine for fabricating high-quality nanofiber devices from industry-standard optical fibers. Our process involves a heat-and-pull method to create tapered shapes with the Frame-Brushing technique. We use a specially designed pulling rig to control this process. In this rig, the optical fiber is secured on precision translation stages that are numerically controlled by programmed movement sequences. The heat source with a hydrogen-oxygen flame is also mounted on a precision translation stage. This allows us to numerically control the heat source movement during the pulling sequence.

In an example, the process involves one or more of the steps, which are further described below.

Preparation of an optical fiber: In an example, optical fiber typically has a jacket to protect the glass fiber body from damage. To process the fiber, the jacket must be removed, and the glass fiber surface must be cleaned. For instance, we might heat the jacket and use precisely positioned mechanical blades to remove it. Alternatively, we can use a $CO_2$ laser to heat and evaporate the jacket material. After removal, we wipe the glass fiber surface with a lint-free cloth and a cleaning solution, such as anhydrous ethanol, IPA, acetone, or other chemicals. To ensure the surface is clean, we might use an optical microscope, mirrors, and a moving stage for inspection.

Mounting an optical fiber on the rig: In an example, precise alignment of the fiber to the pulling rig is critical for proper fiber processing. In an example, the fiber mount on our pulling rig may incorporate a 6-axis stage to align a V-groove for the fiber holder with the moving axis of the translation stage. To fix the fiber as close as possible to the heating area, we employ a thin, rigid wafer—like a silicon wafer—to support the fixing point. We also utilize UV-curable glue to secure the fiber without applying mechanical force during the fixing or curing process. Additionally, we install multiple cameras to monitor the fiber's position with high resolution after mounting. Thanks to this optical observation method, the reproducibility of the mounting process is improved.

Figure 6:
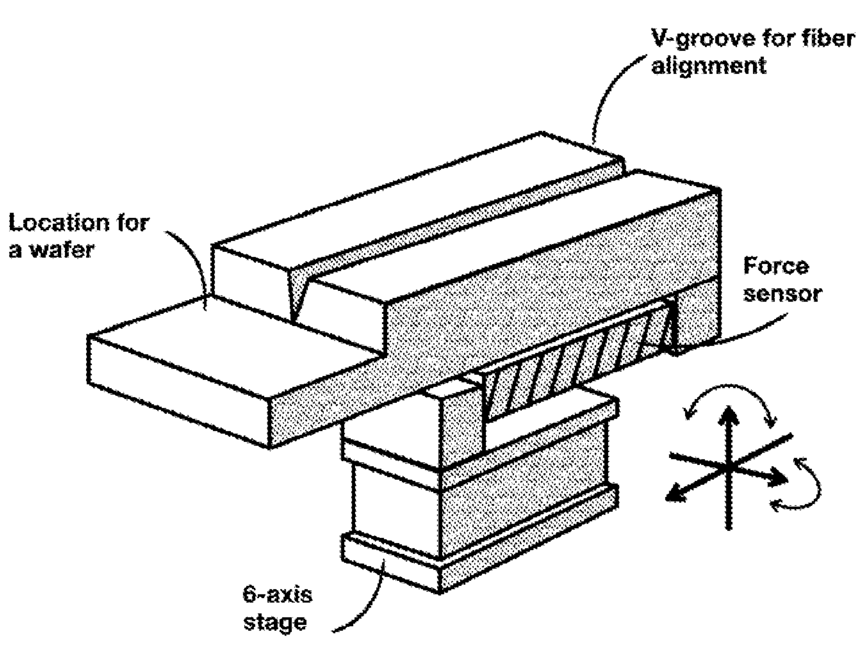
FIG. 6 shows a simplified diagram of a fiber clamp with a force sensor in an example of the present invention.

Numerically controlled pulling sequence: In an example, we use a heat-and-pull method to process the fiber. The heating element can be an oxygen-hydrogen gas flame, heated solid-state elements, or resistive heaters. The heating element and the fiber holding stages are fixed on numerically controlled translation stages. The movement sequences of the stages are designed to fabricate an optimal shape of the fiber taper and nanofiber as described in the numerical optimization process of the taper shape. These sequences are calculated and stored on a PC. We select the desired process sequence tailored for each application on the PC and initiate the processing by sending the stage movement information from the PC to the motor drivers. The heating condition is also managed by the PC, as it needs to be adjusted throughout the fiber processing. We also use a precise force sensor to measure the force during processing. FIG. 6 shows an example structure of the sensor including the V-groove. The data from this sensor can provide real-time feedback to the heating condition. In addition, the sensor data can be analyzed to optimize the settings for heating for the fiber processing. In addition, we utilize heating control to optimize the heating condition according to the processing fiber diameter. As the fiber diameter changes, the optimal heating condition may change. We control the flow of the flammable gas by using computer-controlled flow controllers. Additionally, we can control the heating condition by adjusting the distance between the fiber and the torch. The flame's shape can be controlled by arranging openings for the flame torch. By adjusting the relative position of the processed fiber and the torch with a customized flame shape, we can manage the heating condition at the fiber.

Retrieval of processed optical fiber from the rig: In an example, the processed fiber is generally very fragile, as the diameter of its thinnest part might be less than 1 micrometer. To retrieve this fiber from the rig for the subsequent applications, an appropriately designed fiber holding unit is necessary. The design of the holding unit can vary based on the applications. The holder's position can be precisely controlled using either manual or motorized precision stages and observed with cameras. Using images from these cameras, we monitor the distance between the holder and either the fiber or the rigid wafer that secures the fiber. Once the optimal distance is achieved, we use glue or a clamp to secure the fiber or wafer. The holder is then used to move the processed fiber instead of directly handling the processed fiber.

FIG. 1 shows a simplified flow chart of a calculation of adiabatic angle as a function of fiber diameter according to an example of the present invention. In an example, with given a nanofiber diameter and an operating wavelength, a base optical fiber cable is determined. If characteristic parameters of the optical fiber cable, such as refractive indices of a fiber core and a fiber clad, and a diameter of the fiber core, are not available from a manufacturer, the parameters are calculated by using a numerical aperture of the optical fiber cable given by the manufacturer or experimentally measured. In the calculation, refractive indices of a core and a clad of the fiber optical cable at a design wavelength are calculated by providing a pure silica clad and a core with dopants to control a refractive index to form an optical waveguide with the given numerical aperture value. By using the fiber parameters, effective indices of $HE_{11}$ and $HE_{12}$ propagation mode as a function of fiber diameter is calculated with an analytical solution or a numerical solver where the ratio between the diameters of the fiber core and the fiber clad remains constant in each fiber diameter. By using calculated refractive indices of the fundamental $HE_{11}$ mode ($\beta_1$) and a first excited $HE_{12}$ mode ($\beta_2$), an adiabatic angle $\Omega(r)$ as a function of a fiber radius as $$\Omega(r) = \frac{r(\beta_1 - \beta_2)}{2\pi},$$

where r is a fiber diameter, is calculated.

Figure 2:
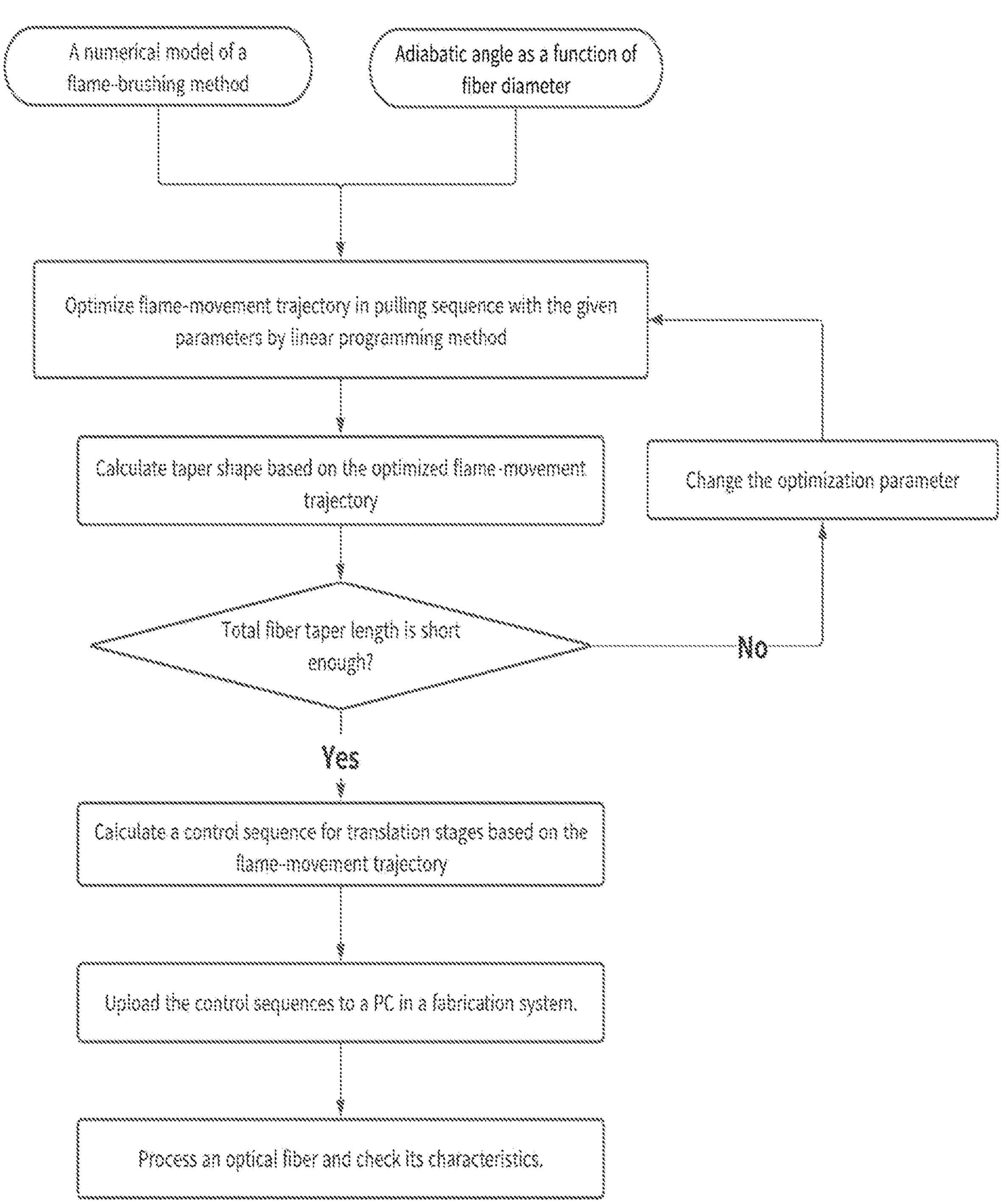
FIG. 2 shows a simplified diagram of a workflow of calculation of a flame-movement trajectory based on the adiabatic angle in an example of the present invention.

FIG. 2 shows a simplified flow chart of calculation of a desired flame-movement trajectory to realize an adiabatic transmission and a short total length rig in an example of the present invention. To define the transmission adiabaticity, a numerical constant f is introduced in a constraint of the optimization such that $\theta_i \leq f \times \Omega(r_i)$, where $\theta_i$ and $r_i$ are defined in FIG. 10. In the optimization, the nanofiber device length is used as an objective function. By using a linear programming with flame-movement trajectory as variables, a desired trajectory and a desired nanofiber device structure are obtained. The trajectory is converted to moving sequences for each translation stage in a pulling rig and the moving sequences are uploaded to a computer connected to translation stages in a pulling rig.

Figure 3:
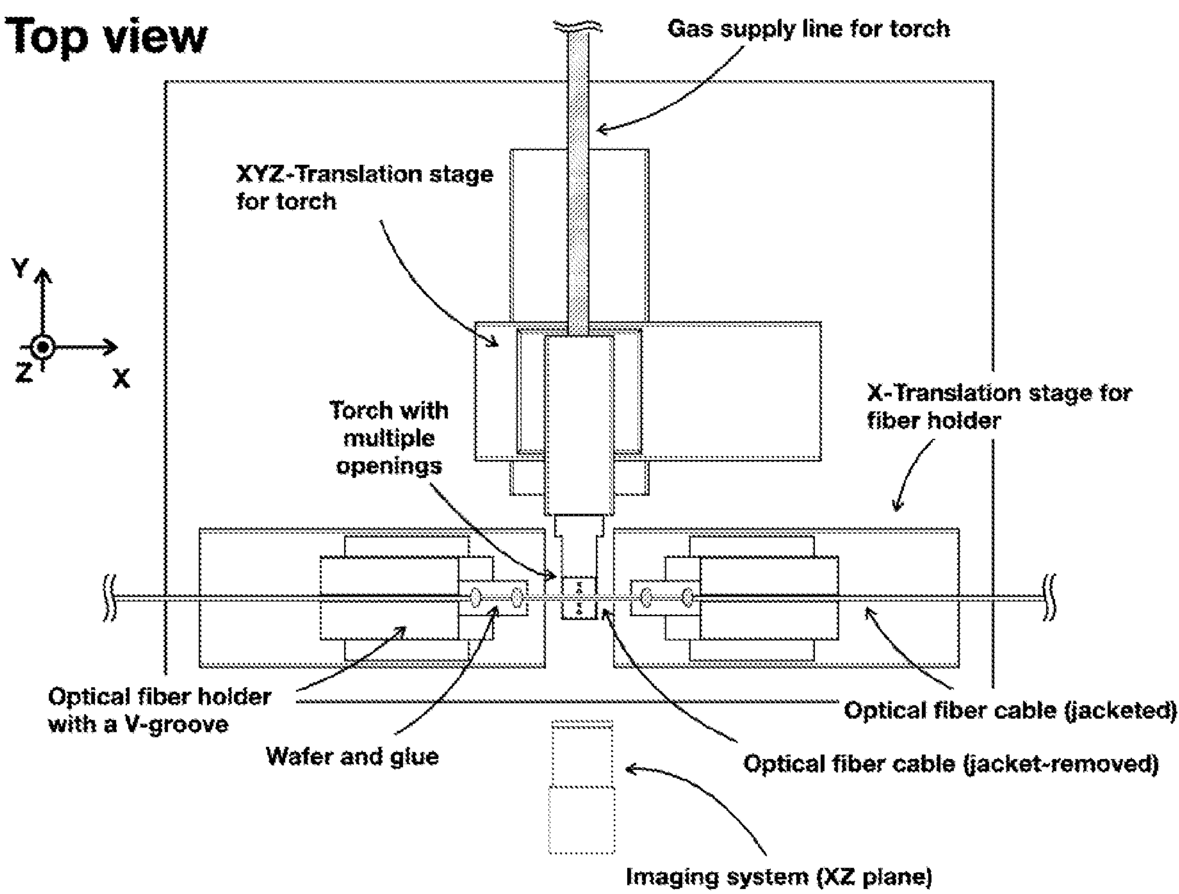
FIG. 3 shows a simplified diagram of a top view of a fiber pulling rig in an example of the present invention.
Figure 4:
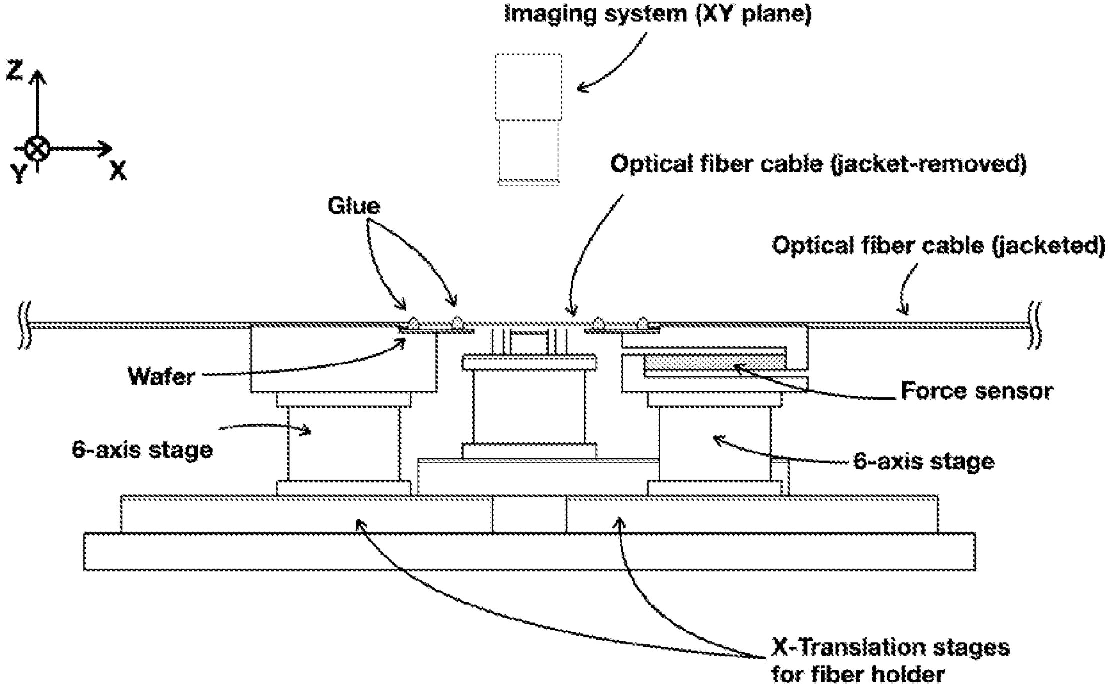
FIG. 4 shows a simplified diagram of a side view of a fiber pulling rig in an example of the present invention.

FIG. 3 and FIG. 4 respectively show simplified diagrams of a fiber pulling rig from a top view and a side view in an example of the present invention. As shown, the rig has translation stages for a heating-torch assembly and two fiber holders for a first end and a second end of an optical fiber cable. One of the fiber holders features a V-groove for aligning the optical fiber cable and a wafer for supporting the optical fiber cable via gluing. In addition, one of the fiber holders has a force sensor to measure an applied tension to the optical fiber cable. The holders have a 6-axis stage to control a tip, a tilt, a yaw, an x, y, z-axis control for an alignment. The holders are mounted on a linear translation stage. The pulling rig has imaging systems orthogonally mounted to observe relative position between the optical fiber and the heating-torch assembly.

Figure 5:
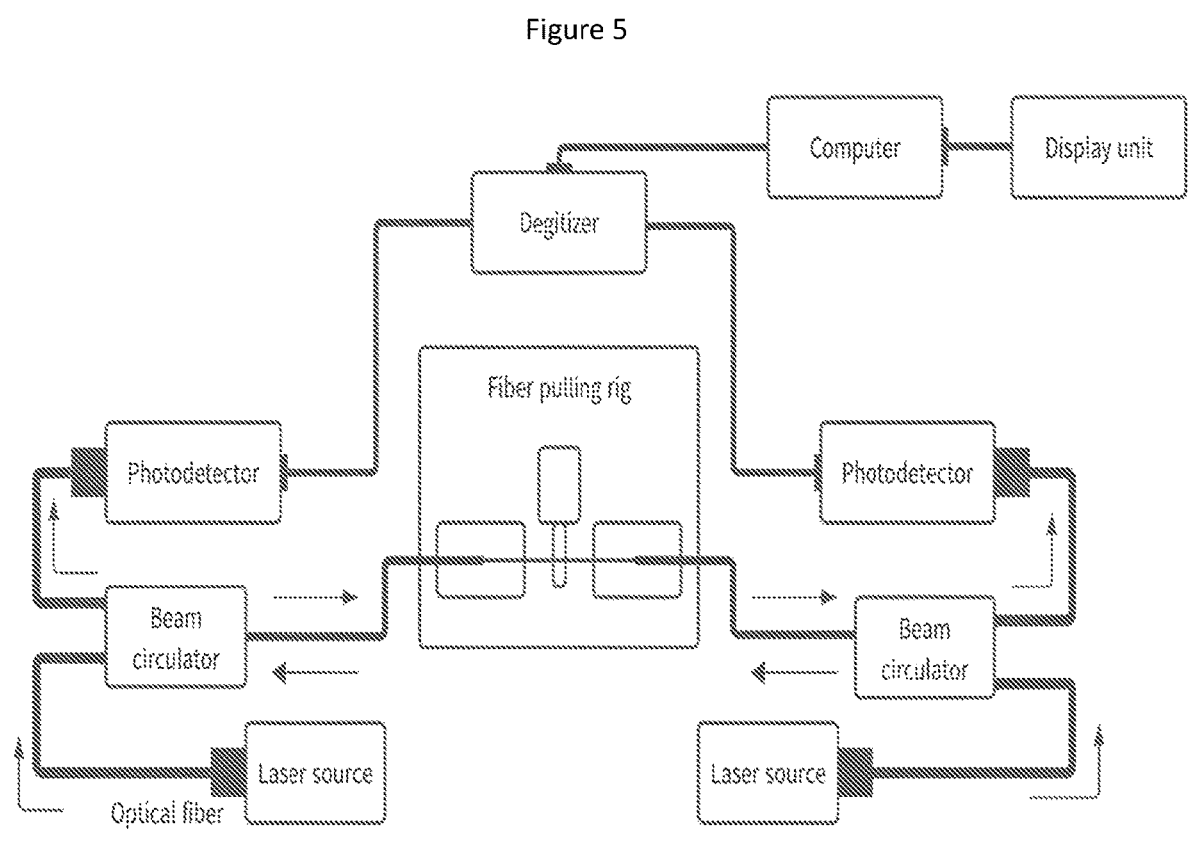

FIG. 5 shows a simplified diagram of an optical characterization device in an example of the present invention. The device has two laser sources, beam circulators and photo detectors to measure transmittance in two different wavelengths. The signals from the photo detectors are recoded with a computer by using a digitizer and displayed on a display unit during a nanofiber fabrication process.

FIG. 6 shows a simplified diagram of a fiber holder assembly with a force sensor in an example of the present invention. The holder has a V-groove for aligning an optical fiber cable, a force sensor to measure applied force to the optical cable. The holder is mounted on a 6-axis stage to control a tip, a tilt, a yaw, an x, y, z-axis control for an alignment.

Figure 7:
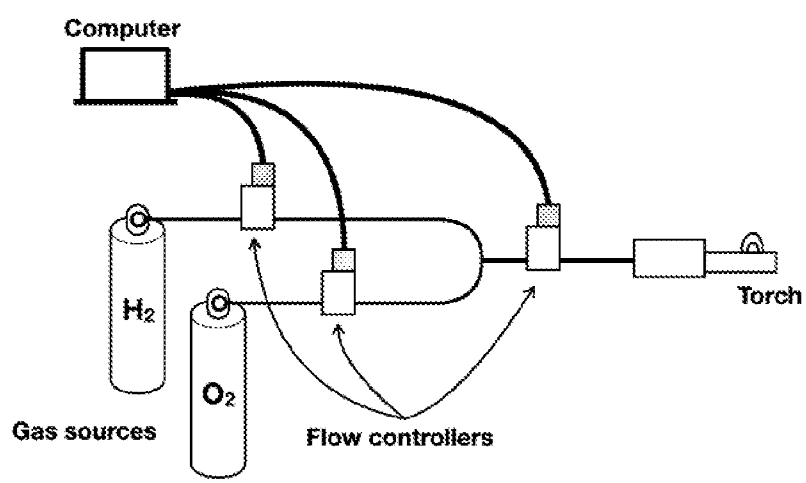
FIG. 7 displays simplified diagrams of gas controllers for the flame torch in the fiber processing machine in an example of the present invention.
Figure 7:
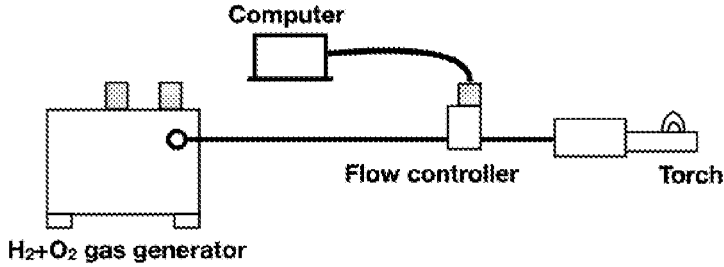

FIG. 7 shows two simplified diagrams of flammable-gas control units in an example of the present invention. The upper diagram shows a flammable-gas control unit with a hydrogen gas tank and an oxygen gas tank. The unit has three flow controllers for hydrogen gas, oxygen gas, and hydrogen-oxygen mixture gas to control each flow and each controller is connected to a computer. The gas pipe is connected to a torch tip. The bottom diagram shows a flammable-gas control unit with a hydrogen-oxygen gas generator. The unit has a flow controller to control a flow of hydrogen-oxygen mixture gas.

Figure 8:
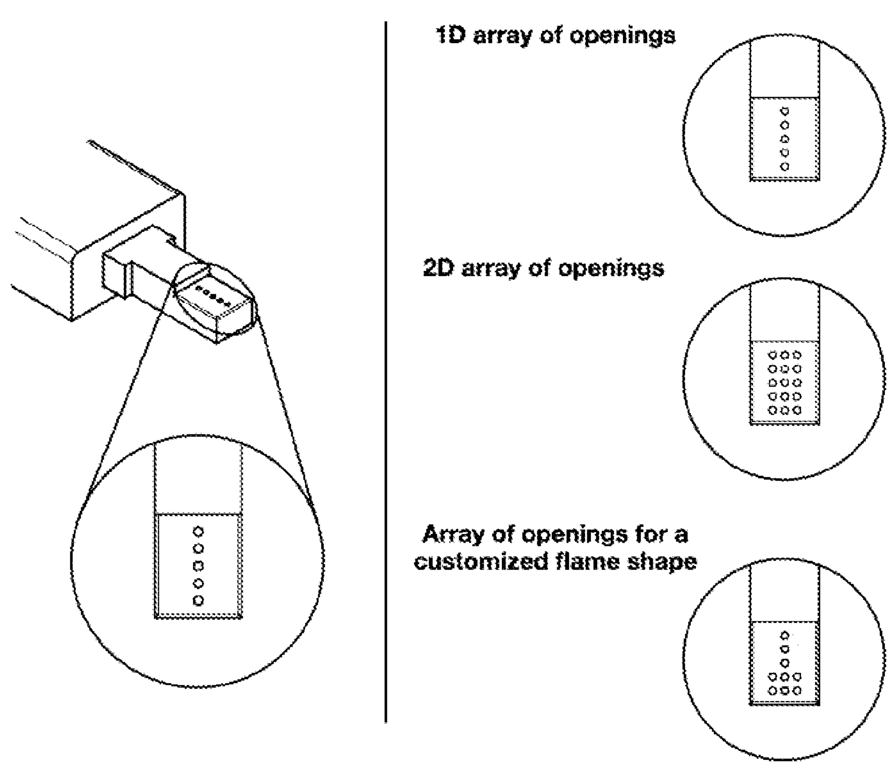
FIG. 8 shows simplified diagrams of hole arrays on the flame torch tip in an example of the present invention.

FIG. 8 shows some examples of arrangements of opening in a heating-torch assembly in an example of the present invention. There are a 1D and a 2D array of openings to control shape of a flame.

Figure 9:
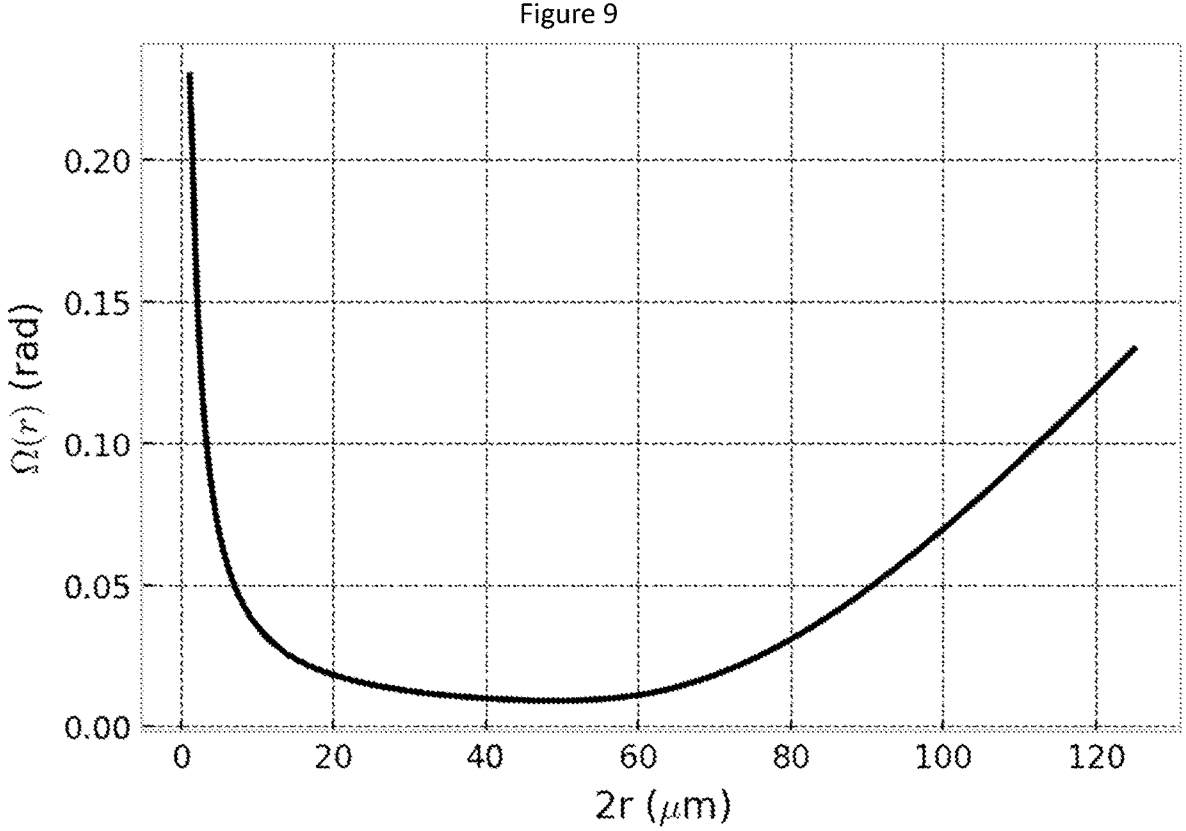
FIG. 9 shows a simplified illustration of calculated adiabatic angles as a function of the fiber diameter in an example of the present invention.

FIG. 9 shows an example of an adiabatic angles as a function of fiber diameter in an example of the present invention. In the example, we use SM800 (5.6/125) from Fibercore as the base fiber, with 852.3 nm as the operating wavelength.

FIG. 10 shows a schematic description of a linear volume-transport model for modelling pulling process in an example of the present invention. In this model, a volume heated during flame-movement remains constant while being pulled from both ends. In the i-th movement, the flame travels a distance of $L_i$, and the fiber is pulled to a length of $2VL_i$, where $V=v_{stage}/v_{torch}$. $v_{stage(torch)}$ is velocity of the stage for the fiber holder (heating-torch), respectively. By using the constant volume assumption, the fiber radius $r_i$ in the i-th movement can be calculated with radius $r_{i-1}$ in the (i−1)-th movement as follows: $r_i=\sqrt{(1-V)/(1+V)}r_{i-1}$. In addition, by using the fiber radius, taper angle $\theta_i$ is also defined as follows: $\tan \theta_{i+1}=(r_{i-1}-r_i)/((1+V)L_i-(1-V)L_{i+1})$.

In an example, the present invention provides a method for manufacturing a nanofiber cable device. The method includes providing a fiber optical cable or other suitable structure. The method includes determining one or more refractive indices of a core and a clad of the fiber optical cable and determining a core diameter of the fiber optical cable. In an example, the method includes determining an effective refractive indices by an analytical solution and/or numerical solution of Maxwell equations of a core-cladding model. In an example, the method includes determining an adiabatic angle as a function of a diameter, ranging from 200 nm to a base fiber diameter and providing a flame-movement trajectory based on a linear volume-transport model. In an example, the method includes generating motorized-stage trajectory, e.g., spatial.

In an example, the fiber optical cable comprises one or more refractive indices of a core and a clad of the fiber optical cable at a design wavelength of the fiber optical cable calculated by providing a pure silica clad and a core with dopants to control a refractive index to form an optical waveguide with a given numerical aperture value specified.

In an example, the method includes one or more dispersions of a pure silica, and one or more dopants are using a Sellmeier equation. In an example, the method includes a core diameter of the fiber optical cable is calculated by comparing a specified mode field diameter and an analytically obtained propagation mode fields by using one or more calculated refractive indices.

In an example, one or more effective indices for a fundamental $HE_{11}$ mode and a first excited $HE_{12}$ mode, the first excited $HE_{12}$ mode has a same symmetry as the $HE_{11}$ mode. In an example, the $HE_{11}$ mode functions of a fiber diameter are calculated by assuming a ratio of a clad and one or more core diameters remains constant. In an example, the calculation comprises an analytical solution for a core-clad step-index waveguide used with a refractive index of the core and clad materials when the fiber core diameter is larger than the operating wavelength.

In an example, the fiber core diameter is smaller than an operating wavelength, the analytical solutions for the core-clad step-index waveguide are used assuming the core with the refractive index of the clad of the base fiber and the clad refractive index of the vacuum and neglecting the contribution from the fiber core.

In an example, an adiabatic angle $\Omega(r)$ as a function of a fiber radius is calculated by using a calculated refractive indices of a fundamental $HE_{11}$ mode ($\beta_1$) and a first excited $HE_{12}$ mode ($\beta_2$) as $$\Omega(r) = \frac{r(\beta_1 - \beta_2)}{2\pi},$$

where r is a fiber radius.

In an example, the method further comprises a numerical model of a flame-brushing method is based on a linear volume-transport model. In an example, the method comprises an optimization of a flame-movement trajectory is performed with a linear programming method, or any other numerical optimization algorithm whereupon in the linear programming method, constraint from the numerical model of the flame-brushing method is applied. In an example, the desired flame-movement trajectory is converted to the moving sequences for each translation stage in a pulling rig. In an example, the method has an optical fiber processing method, including removing a jacket of the fiber optical cable, cleaning the fiber optical cable, aligning the fiber optical cable to a pulling rig for pulling, controlling one or more pulling sequences by using motorized translation stages, and performing one or more optical measurements during the pulling to evaluate the pulling.

In an example, the jacket of the optical fiber cable is removed by using a heat-jacker remover, or a laser heating-and-evaporation method. In an example, the optical fiber cable is mounted on the pulling rig such that a fiber position is relative to a torch monitored by imaging systems with an objective lens and controlled by a translation stage in the heating-torch assembly. In an example, the optical fiber cable is aligned with one or more V-grooves configured on one or more fiber holders. In an example, the optical fiber cable is fixed on one or more holders while an applied tension is monitored by a force sensor. In an example, an applied tension for the fiber optical cable is monitored during a processing such that a tension is controlled to be less than 0.03 N with changing a flame condition by controlling a flammable gas flow by a mass flow controllers and/or moving a flame position relative to the optical fiber cable and/or by translating a torch position relative to the fiber optical cable to change an array of holes under the fiber to change a flame shape at a heated fiber area. In an example, one or more transmission signals from one or more photo detectors and a signal of a force sensor and one or more images or videos taken by one or more imaging systems that are recorded by using a computer. In an example, a photodetector signal calculated to be transmittance corresponding to each wavelength and displayed in real-time on the display unit. In an example, a photodetector signal is used to calculate a spectrogram to diagnose a pulling process including elucidating a fiber diameter change in a pulling process.

Of course, one of ordinary skill in the art would recognize other variations, modifications, and alternatives.

REFERENCES

J. D. Love and W. M. Henry, "Quantifying loss minimisation in single-mode fibre tapers," Electronics Letters 22, 912 (1986).

G. Brambilla, "Optical fibre nanowires and microwires: a review," Journal of Optics 12, 043001 (2010).

S. Ravets et al., "Intermodal energy transfer in a tapered optical fiber: optimizing transmission," Journal of the Optical Society of America A 30, 2361 (2013). Japan Patent Application JP 2016-153850 A, filed on Feb. 20, 2015.

In an example, storing nanofibers in a clean environment is desirable, particularly due to their physical properties and applications.

Contamination Avoidance: Nanofibers have high surface area-to-volume ratios, making them particularly susceptible to contamination. Dust, moisture, oils, and other environmental contaminants can adhere to the fibers, altering their properties and performance.

Maintaining Structural Integrity: Contaminants can affect the structural integrity of nanofibers. For example, exposure to certain chemicals or humidity can cause them to degrade, clump together, or change in structure, which can weaken their mechanical properties.

Preserving Chemical Properties: Many applications of nanofibers rely on their chemical properties, such as catalytic activity or reactivity. Contamination can significantly alter these properties, rendering the nanofibers less effective or even useless for their intended application.

Avoiding Interference in Research and Applications: In research settings, where nanofibers may be used in experiments or as part of material development, any contamination can skew results and lead to inaccurate conclusions. In industrial or medical applications, such as filtration systems or drug delivery, contamination can lead to failure of the system or pose safety risks.

Ensuring Reproducibility and Consistency: For manufacturing and quality control purposes, storing nanofibers in a clean environment ensures that their properties remain consistent from one batch to another. This is critical for industries where reproducibility is a key factor, such as in the pharmaceutical or electronics sectors.

Long-term Stability: To ensure the long-term stability and shelf-life of nanofibers, a clean, controlled environment can prevent processes like oxidation or hydrolysis which might degrade the fibers over time.

In an example, the storage of nanofibers in a clean environment is desirable to maintain their quality, effectiveness, and safety. This involves controlling factors such as humidity, temperature, and exposure to contaminants, often using specialized storage equipment and protocols.

In an example, the present invention provides a system comprising a chamber to accommodate nanofiber devices safely and conveniently.

The present invention relates to a storage container designed specifically for nanofiber devices. Nanofiber devices, characterized by their extremely thin diameters on the order of a few micrometers or less than 1 micrometers, are sensitive to surface contamination and have been traditionally difficult to handle. Existing methods required immediate use after fabrication in a clean environment. To address these challenges, a portable, small chamber-shaped container and storage method have been invented. This storage method presented allows the optical characterization and polarization analysis of the stored nanofiber device without needing to break the storage container.

In an example, the present invention provides a nanofiber device storage system. The storage system has a chamber having an interior region, a first end region, and a second end region. In an example, the chamber can be a cylinder, a sphere, a trapezoidal, or other desired shapes. In an example, the system has a gas inlet configured to the chamber and configured to fill the interior region with an inert gas. In an example, the inert gas comprising a nitrogen, an argon, a helium, or any combination thereof, the inert gas being free from particles greater than 100 nanometers and greater along a major axis, but can be others. In an example, the system has a gas outlet configured to the chamber and a nanofiber device spatially disposed within the interior region of the chamber and enclosed in the inert gas. In an example, the system has a fiber feedthrough operably coupled to the nanofiber device and configured to transmit electromagnetic radiation to the nanofiber device.

In an example, the fiber feedthrough comprises an input and an output; and further comprises a lid device holding the nanofiber device and configured with the fiber feedthrough. In an example, the fiber feedthrough is made of a Teflon™ material, among others. In an example, the fiber feedthrough is characterized by a diameter ranging, e.g., from 110 micrometers to 250 micrometers, to couple to an optical fiber jacket device. In an example, the chamber is made of a metal, a dielectric, a plastic, or a semiconductor or any combinations thereof. In an example, the inert gas is sealed in the chamber.

In an example, the electromagnetic radiation (e.g., light, laser pulse) is provided to test an operation of the nanofiber device. In an example, the chamber comprises a portion that is optically transparent.

In an example, the nanofiber device comprises a nanofiber cavity having a fiber optical cable having a first end region and a second end region. In an example, the first end region has a first end, and the second end region has a second end. In an example, the fiber optical cable comprises silicon dioxide material with a germanium entity distributed inside of a core region, a first fiber Bragg Grating configured on the first end region, and a second fiber Bragg Grating configured on the second end region. The device has a nanofiber region configured from a center portion of the fiber optic cable and coupled between the first end region and the second end region. In an example, the nanofiber region has a transmission of 95% and greater. In an example, the nanofiber region has a diameter ranging, e.g., from 300 nanometer to 1.5 micrometer. In an example, the nanofiber region ranges, e.g., from 10 micrometer to 10 centimeter in length. The nanofiber has a first taper region configured from a first portion of the nanofiber region within a vicinity of the first fiber Bragg grating and a second taper region configured from a second portion of the nanofiber region within a vicinity of the second fiber Bragg grating. The nanofiber has a cavity formed from the nanofiber outside of the tapered region between the first fiber Bragg Grating and the second fiber Bragg grating.

In an example, the system has a device monitoring device including one or more of lasers sources, a photodetector, an imaging device, and a PC for data analysis, a fiber optical cable and a coupler.

In an example, the chamber is characterized as a storage chamber maintained at a pressure, e.g., ranging from $10^6$ Pa to $10^{-6}$ Pa. In an example, the interior region of the chamber is subjected to a temperature, e.g., ranging 50 to 300 degrees Celsius, for cleaning the interior region.

In an example, the fiber feedthrough is configured to allow an optical fiber cable to connect to the nanofiber device within the chamber without exposing the nanofiber device to one or more external contaminants.

In an example, the nanofiber device is configured with a monitoring system to allow in-situ characterization of an optical performance of the nanofiber device stored in the chamber without opening the chamber.

In an example, the system has a polarization monitoring system operably coupled to the nanofiber device to allow in-situ characterization of a polarization of light at the nanofiber device by using a combination of a polarization-sensitive imaging objective and imaging devices comprising of one or more imaging cameras.

Further details of the present system can be found throughout the present specification and more particularly below.

Figure 11:
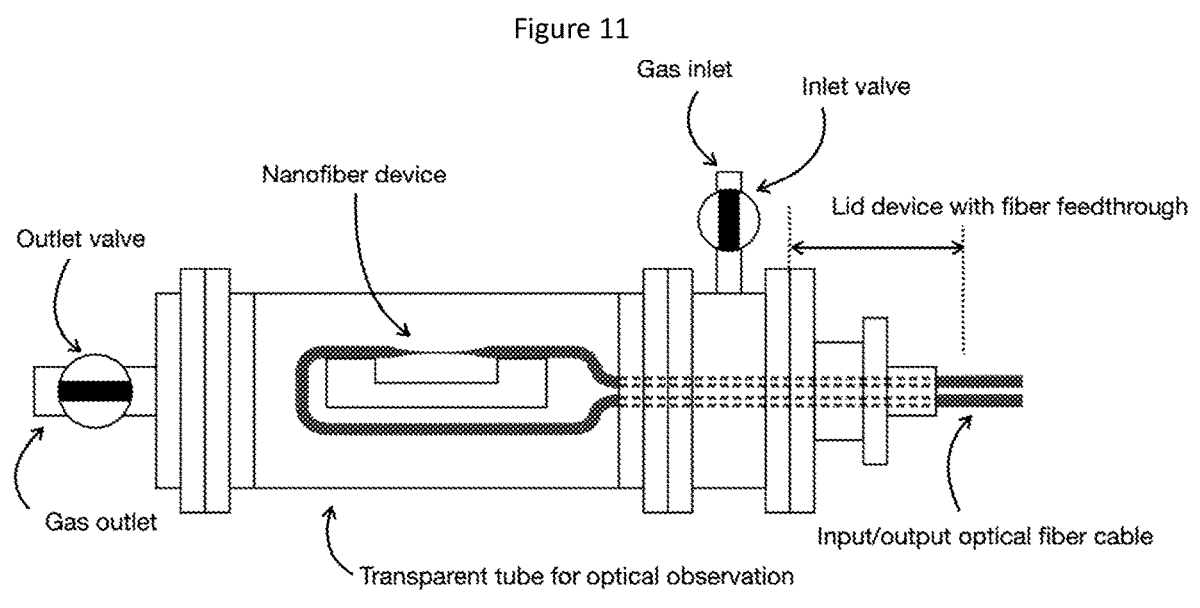

FIG. 11 shows a simplified diagram of a storage system in an example of the present invention. The system comprises a chamber including a transparent tube to optically observe a nanofiber device stored in the chamber, a gas inlet with a valve, a gas outlet with a valve and a lid device having a fiber feedthrough. Once a nanofiber device is placed inside the chamber with a clean gas flow from the inlet to the outlet such as nitrogen, argon, helium or a combination of multiple gas species, the user can seal the chamber effectively preventing contamination of the device by closing the valves.

The chamber has a lid device with optical fiber feedthroughs that allow optical fibers to connect to the nanofiber without exposing the entire device to the external environment. This enables a measurement of the device's optical performance without the need to open the chamber. In an example the lid device is configured with an O-Ring or other sealing member that seals the lid to the opening of the chamber.

Figure 12:
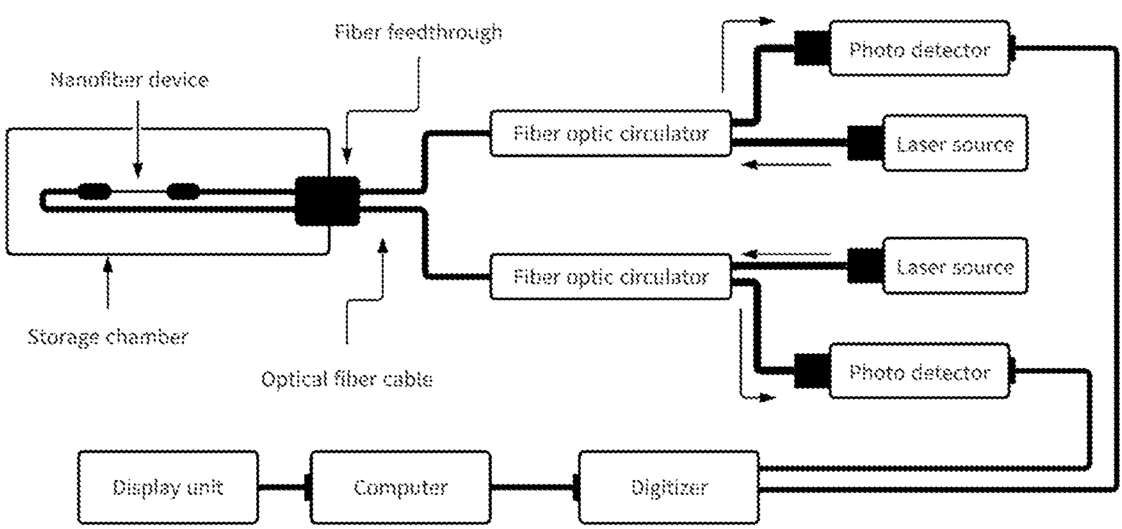
FIG. 12 shows a simplified diagram of a monitoring setup by detecting transmitted and/or reflected electromagnetic radiation through a nanofiber device in a chamber in an example of the present invention.

FIG. 12 shows a simplified diagram of a monitoring system of transmittance and/or reflectance of the nanofiber device in an example of the present invention. The system has two laser sources, fiber optic circulators and photo detectors to measure transmittance and/or reflectance in two different wavelengths. The signals from the photo detectors are recoded with a computer by using a digitizer and displayed on a display unit.

In an example, the chamber comprises a transparent tube or a viewing port to optically observe the nanofiber devices stored in the chamber.

Figure 13:
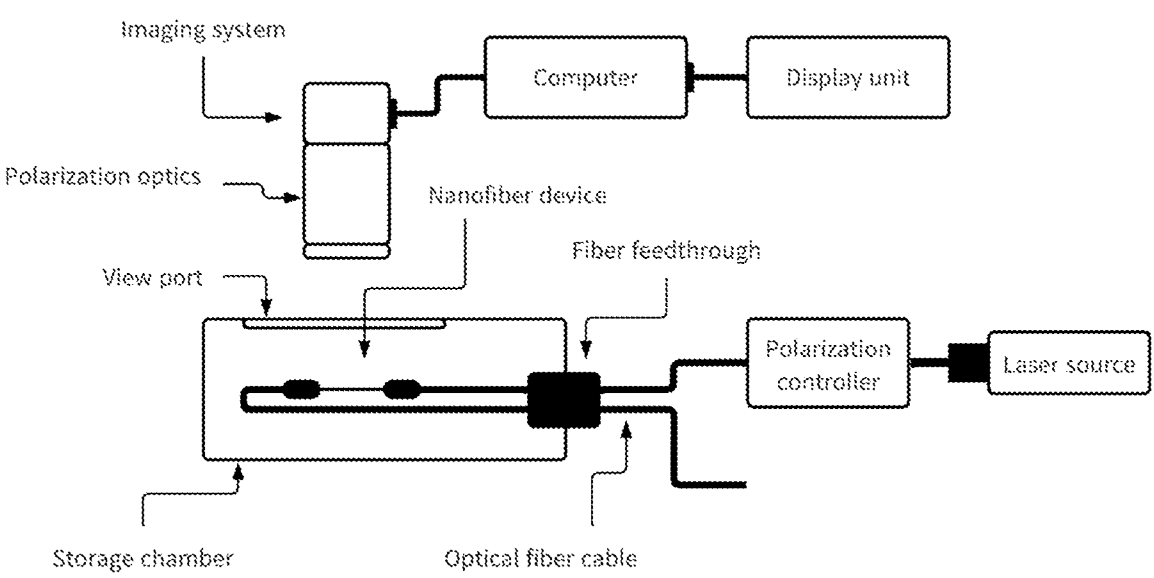
FIG. 13 shows a simplified diagram of an imaging system to characterize polarization properties of a nanofiber device in a chamber in an example of the present invention.

FIG. 13 shows a simplified diagram of a system for characterizing a polarization of light propagation at the nanofiber device by analyzing a polarization of scattered light at the nanofiber device using an imaging system in an example of the present invention. By using the polarization controller outside the chamber, the polarization of the light propagating at the nanofiber device.

In an example, the present storage chamber not only facilitates the long-term preservation of nanofiber devices without compromising their performance but also enables easy transportation to different locations while maintaining the device's integrity.

Figure 14:
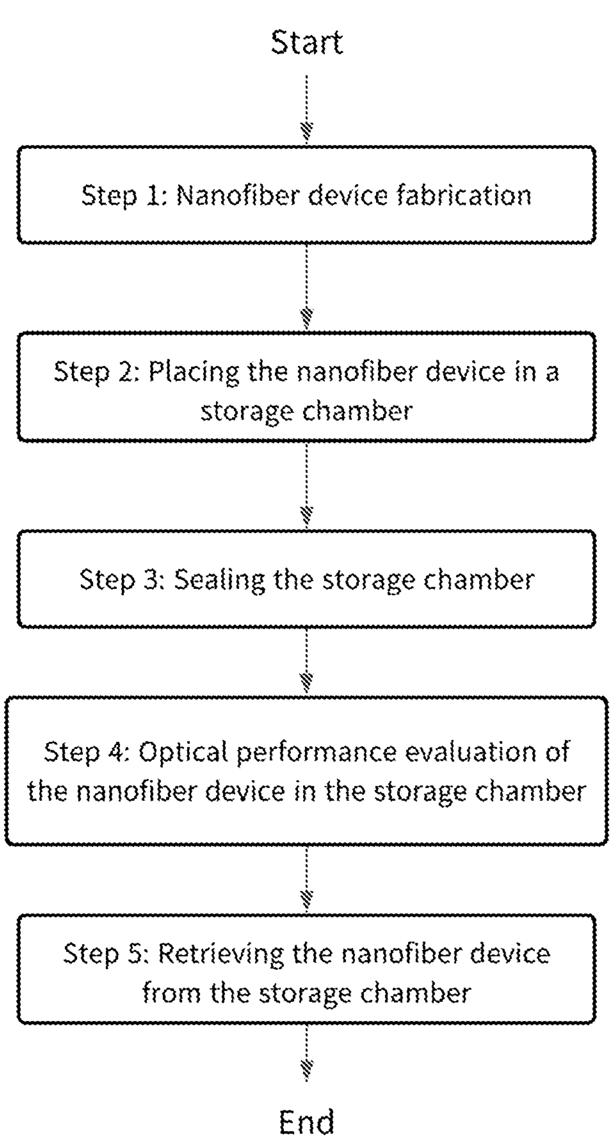
FIG. 14 is a simplified flow diagram illustrating a fabricating method and a storage method according to an example of the present invention.

In an example, the present invention provides a method of fabricating and containing a nanofiber device. One or more of the steps are provided below, See also FIG. 14.

Step 1: Nanofiber Device Fabrication

First, nanofiber devices are fabricated using a specialized optical fiber processing device, as described above.

The fabricated nanofiber devices are securely fixed onto holders designed for this purpose.

Optical fibers connected to the nanofiber devices are extended from these holders.

Step 2: Placing in the Storage Container

The holders with the nanofiber devices are placed in a storage container that has been thoroughly cleaned and prepared for this purpose.

While introducing clean gases, such as nitrogen, argon, helium or a combination of multiple gas species, into the container, the interior of the container is kept clean during the installation.

Step 3: Sealing the Storage Container

A lid device of the container is securely closed, and the input/output valves for gases are closed as well, completing the storage of nanofiber devices.

In an example, the clean gases inside the container create a contamination-free environment, preserving the nanofiber devices.

Step 4: Optical Performance Evaluation

Optical fibers extending from the holders are brought out of the container using optical fiber feedthroughs, allowing for optical testing without opening the container.

Various methods can be used for evaluating device performance:

For a nanofiber device acting as an optical resonator, measurements like a cavity ring-down measurement and transmission and reflection spectroscopy are performed to assess optical losses and wavelength dependencies.

For waveguides, a transmission measurement can be used to evaluate performance.

Additionally, a portion of the container can be made of glass or transparent material to enable optical observation of the nanofiber device from the outside. A combination of optical observation and propagating light fields through the nanofiber device enables measurements of the polarization state of the propagated light within the nanofiber device by collecting images of the nanofiber region with polarization control of input light.

Step 5: Retrieving the Nanofiber Device from the Chamber

When it is time to retrieve the nanofiber device from the chamber, the chamber is opened while continuing to introduce clean gases, such as nitrogen, argon, helium or a combination of multiple gas species.

This clean gas flow prevents contamination of the nanofiber device during removal.

These steps collectively illustrate the process of fabricating, storing, evaluating, and retrieving nanofiber devices while maintaining a contamination-free environment throughout the procedure.

In an example, the present invention provides a method for storing nanofiber devices, e.g., nanofiber. The method includes providing a chamber having an interior region, a first end region, and a second end region. The method includes flowing through a gas inlet configured to the chamber to fill (or flow) the interior region with an inert gas, such as, e.g., a nitrogen, an argon, a helium, or any combination thereof. In an example, the inert gas is free from particles greater than 100 nanometers and greater along a major axis; a gas outlet configured to the chamber. The method includes disposing a nanofiber device spatially disposed within the interior region of the chamber and enclosed in the inert gas while maintaining the flow of the gas to enclose the nanofiber device and terminating the flow of gas to seal the chamber.

In an example, the method includes transmitting electromagnetic radiation through a fiber feedthrough operably coupled to the nanofiber device and, optionally, monitoring optical performance comprising of a transmission, a reflection and a performance metric while the nanofiber device is inside the chamber.

In an example, the method includes characterizing a polarization of light propagation at the nanofiber device by analyzing a polarization of scattered light at the nanofiber device using an imaging system. The method includes controlling a light polarization at the nanofiber device by adjusting an input polarization coupled to the nanofiber device.

In an example, the disposing comprises inserting the nanofiber device configured on a lid device having a feedthrough coupled to the nanofiber device. The lid device has a region that is configured with a seal, e.g., O-Ring, or other structure to enclose the lid device with an opening of the chamber.

REFERENCES

S. Kato and T. Aoki, "Single-frequency fiber Fabry-Perot Brillouin laser", Opt. Lett. 47, 5000 (2022).

Eric R. I. Abraham and Eric A. Cornell, "Teflon feedthrough for coupling optical fibers into ultrahigh vacuum systems," Applied Optics 37, 1762 (1998).

While the above is a full description of the specific examples, various modifications, alternative constructions, and equivalents may be used. As an example, the device can include any combination of elements described above, as well as outside of the present specification. Additionally, the terms first, second, third, and final do not imply order in one or more of the present examples. Therefore, the above description and illustrations should not be taken as limiting the scope of the present invention which is defined by the appended claims.

The invention claimed is:

1. A method for manufacturing a nanofiber cable device, the method comprising:

providing a fiber optical cable;

determining one or more refractive indices of a core and a clad of the fiber optical cable;

determining a core diameter of the fiber optical cable;

determining an effective refractive indices by an analytical solution and/or numerical solution of Maxwell equations of a core-cladding model;

determining an adiabatic angle as a function of a diameter, ranging from 200 nm to a base fiber diameter;

providing a flame-movement trajectory based on a linear volume-transport model; and generating motorized-stage trajectory.

2. The method of claim 1 wherein the fiber optical cable comprises one or more refractive indices of the core and the clad of the fiber optical cable at a design wavelength of the fiber optical cable calculated by providing a pure silica clad and a core with dopants to control a refractive index to form an optical waveguide with a given numerical aperture value specified.

3. The method of claim 2 further comprising determining one or more dispersions of a pure silica and one or more dopants are using a Sellmeier equation.

4. The method of claim 1 further comprising calculating a core diameter of the fiber optical cable by comparing a specified mode field diameter and an analytically obtained propagation mode fields by using one or more calculated refractive indices.

5. The method of claim 1 further comprising determining one or more effective indices for a fundamental $HE_{11}$ mode and a first excited $HE_{12}$ mode, the first excited $HE_{12}$ mode has a same symmetry as the $HE_{11}$ mode.

6. The method of claim 5 wherein the $HE_{11}$ mode functions and the $HE_{12}$ mode functions of a fiber diameter are processed by assuming a ratio of a clad and one or more core diameters remains constant.

7. The method of claim 6 wherein the processing comprises using an analytical solution for a core-clad step-index waveguide used with a refractive index of the core and the clad materials when the fiber core diameter is larger than the operating wavelength.

8. The method of claim 6 wherein the processing comprises using an analytical solution for a core-clad step-index waveguide used with a refractive index of the clad material and vacuum when the fiber core diameter is smaller than an operating wavelength.

9. The method of claim 6 wherein the processing comprises using a numerical solution for a core-clad-vacuum step-index three-layer waveguide used with a refractive index of the core and the clad materials and vacuum.

10. The method of claim 1 further comprising generating an adiabatic angle $\Omega(r)$ as a function of a fiber radius is calculated by using a calculated refractive indices of a fundamental $HE_{11}$ mode ($\beta_1$) and a first excited $HE_{12}$ mode ($\beta_2$) as $$\Omega(r) = \frac{r(\beta_1 - \beta_2)}{2\pi},$$

where d is a fiber diameter.

11. The method of claim 1 further comprising using a numerical model of a flame-brushing method is based on a linear volume-transport model.

12. The method of claim 1 wherein the calculation of the flame-movement trajectory is performed with a linear programming method, or a numerical optimization algorithm whereupon in the linear programming method, constraint from a numerical model of a flame-brushing method is applied.

13. The method of claim 1 wherein the flame-movement trajectory is converted to one or more moving sequences for each translation stage in a pulling rig.

14. The method of claim 1 further comprising an optical fiber processing method, the method comprising:

removing a jacket of the fiber optical cable;

cleaning an exposed region of the fiber optical cable;

aligning the fiber optical cable to a pulling rig for pulling;

controlling one or more pulling sequences by using a motorized translation stage; and performing one or more optical measurements during the pulling to evaluate the pulling.

* * * * *